US006182281B1

(12) United States Patent
Nackman et al.

(10) Patent No.: US 6,182,281 B1
(45) Date of Patent: Jan. 30, 2001

(54) INCREMENTAL COMPILATION OF C++ PROGRAMS

(75) Inventors: Lee Richard Nackman, White Plains; Michael Karasick, Ossining; John Joseph Barton, Mahopac; Derek Lieber, Yorktown Heights, all of NY (US); David Joseph Streeter, Scarborough (CA)

(73) Assignee: International Business Machines Corporation, Armonk, NY (US)

( * ) Notice: Under 35 U.S.C. 154(b), the term of this patent shall be extended for 0 days.

(21) Appl. No.: 08/838,205

(22) Filed: Apr. 16, 1997

(30) Foreign Application Priority Data

May 1, 1996  (CA) .................................................. 2175711

(51) Int. Cl.[7] .................................................. G06F 9/445
(52) U.S. Cl. .......................... 717/5; 717/2; 717/3; 717/4; 717/7; 717/8; 717/9
(58) Field of Search .................................. 395/702, 703, 395/704, 705, 707, 708, 709; 717/5

(56) References Cited

U.S. PATENT DOCUMENTS

| | | | | |
|---|---|---|---|---|
| 5,105,353 | * | 4/1992 | Charles et al. ........................ | 395/709 |
| 5,170,465 | * | 12/1992 | Mckeeman et al. .................. | 395/707 |
| 5,204,960 | * | 4/1993 | Smith et al. ........................ | 395/707 |
| 5,276,880 | * | 1/1994 | Platoff et al. ........................ | 395/708 |
| 5,386,570 | * | 1/1995 | Lindhorst ............................. | 395/707 |
| 5,560,010 | * | 9/1996 | Albert ................................... | 395/702 |
| 5,586,328 | * | 12/1996 | Caron et al. ............................. | 717/5 |

OTHER PUBLICATIONS

Knapen et al., "Parsing C++ Despite Missing Declarations", IEEE, pp. 114–125, May 1999.*
Magnusson et al., "Integrated Interactive Incremental Programming Environment Based on Compilation", ACM, pp. 235–244, 1985.*
Heering et al., "Incremental Generation of Parsers", IEEE, pp. 1344–1351, Dec. 1990.*
Larcheveque et al., "Optimal Incremental Parsing", ACM Transactions, pp. 1–15, Jan. 1995.*

* cited by examiner

Primary Examiner—Tariq R. Hafiz
Assistant Examiner—Ted T. Vo
(74) Attorney, Agent, or Firm—F. Chau & Associates, LLP

(57) ABSTRACT

An enhanced compiler for compiling C++ programs without the use of forward declarations normally included in program header files. Through multiple parsing passes, the compiler extracts definitions for the declarations directly from the bodies of the C++ files. By saving the definitions to a persistent program representation, for example a program database, on subsequent sweeps, only definitions for new or changed declarations need be updated. In this way, C++ programs can be incrementally compiled on a declaration by declaration basis.

31 Claims, 9 Drawing Sheets

INCREMENTAL COMPILATION OF C++ PROGRAMS

FIELD OF THE INVENTION

The present invention is directed to a technique permitting incremental compilation of C++ programs.

BACKGROUND OF THE INVENTION

C++ is an object-oriented programming language in which programs are created using a set of language tools, abstraction and constructs that support a particular form of user-defined types, called "classes". Each such type associates a collection of declared data with a set of operations on that data. Variables, or instances, of such types in the running programs are called objects.

Classes can be related to one another by inheritance. The properties, behaviors, data, and operations of a parent, or "base", class may be inherited without modification by some child, or "derived" class, or the behaviors, properties, and operations may be selectively refined under control of the programmer. When defining a derived class, one may start by building on an existing base class which is similar to the one to be created. The derived class inherits the implementation and behavior of the base class, except as modified by amendments detailed in the derived class definition. Several classes can inherit the behaviors of a common parent, and a derived class may inherit from more than one base class. A member function is a function or operation defined as a behaviour of some user-defined type where that type participates in a hierarchy of other types.

A feature of C++ programming is that it is text-based, and its classes are stored in separate files. Class declarations are usually split up into 2 files: a header file with extension ".h" or ".hpp" that contains the class declaration with the member fields and the member function headers, and a body file with extension ".C" or ".cpp" that contains the bodies of the member functions.

In conventional C++ programming, the header files contain important preprocessor directives and forward declarations, the latter providing the declaration ordering to ensure that every name is declared before it is used. Header files are inserted into the source file through the use of the preprocessor directive #include.

However, forward declarations must be manually prepared by the programmer; writing, organizing and maintaining header files (through program revisions) takes considerable programmer time and thought. As a result, mistakes in header files are a frequent source of compile errors.

Header files are also a major source of long program build times in C++ programming. As programmers increasingly exploit C++ classes, the cost of repeatedly reprocessing header files often dominates total compilation time. One result has been the introduction of pre-compiled header files, now supported by most commercial C++ compilers, to counter this problem.

The idea of providing for selective compilation has been addressed at varying levels of granularity. For example, UK Patent No. 2 130 406 B of Reiffen, titled Computer System with Real-time Compilation, discusses a system that partially compiles while the user is editing the source program. The compiler compiles up to a "pause location" in the source defined by the editor and then waits. When the user has made changes up to a point where the editor thinks the compiler can process more, it updates the "pause location" and the compiler does a bit more work. However, this compiler still compiles the source code from start to finish in order. If the user changes the source before the "pause location", the editor tells the compiler to re-initialize and start compiling from the start of source down to the new "pause location".

In C++ compilers, techniques for implementing a form of incremental compilation have been developed, in which a tool called "make" determines which files need to be recompiled by locating those files with time stamps after the last compilation, and then directing the compiler to compile the necessary files. However, conventional C++ compilers that effect file-based batch processing must read the declarations in order, and often read through thousands of lines of unchanged code in a file, or in the header files that the file includes, before processing a changed declaration. (Any file that includes a modified header file must be recompiled, whether or not the modification affects any definition in that file.) Also, the programmer needs to tell "make" about file-level dependencies, and this dependency information must be maintained as the system being developed evolves. While there are tools to maintain the dependencies automatically, they are very slow and, consequently, are not consistently used, leading to errors in the dependency information, and ultimately, problems during recompilation.

Therefore, a system which provided for incremental compilation of changes to C++ programs, effected at top-level declaration incrementality, would greatly reduce compilation time during program development and maintenance.

Also, entirely eliminating the need for forward declarations in C++ programming would provide a major improvement in programmer productivity by eliminating the work involved in preparing the header files initially and correcting errors identified during compilation. An enhancement to the compiler is necessary to dispense with the requirement for the ordering provided in the forward declarations.

SUMMARY OF THE INVENTION

It is an object of the present invention to provide a means for parsing a C++ program during compilation that dispenses with the requirement for forward declarations or other ordering of the defining declarations, and dispenses with the requirement on the programmer to maintain file-level dependency information during program editing.

It is also an object of the present invention to provide a system that can compile and link small changes in C++ programs rather than complete source files, that is, a system for incremental programming.

A further object of the present invention is to provide a means for creating a whole-program representation that will persist through multiple parsing passes of the compiler.

Accordingly, the present invention provides a method for compiling a C++ program in source code that consists of making an initial sweep of the source code, one declaration at a time, to obtain the declarations. Any declaration for which not all identifiers are known in said initial sweep are set aside, and at least one subsequent sweep of the source code is made to obtain definitions for the declarations set aside from the initial sweep.

Preferably, the declarations are saved to a program representation following each sweep of the source code, and the program representation persists between compilations.

The invention also provides a method for parsing a program in C++ source code without ordering or forward declarations, or without header files. In this method, the parsing is done directly of top level declarations.

In a further embodiment, the present invention provides a method for compiling a C++ source code program in an enhanced compiler effecting lexical analysis to tokenize the source code program, parsing and semantic analysis to produce an intermediate representation of the source code program. The improvement of the invention consists of parsing the tokenized source code program through multiple parsing passes, each pass accumulating information to parse declarations in the source code program from program definitions. Preferably, in the initial pass, only type declarations for the tokenized source code program are parsed, and in subsequent passes, information about type names, variables and functions in the source code program is accumulated.

The present invention is also directed to a compiler adapted to compile programs written in C++ source code. The compiler includes a parser adapted to extract definitions for declarations used in the programs directly from the source code by effecting multiple parsing sweeps of the source code. Preferably, the compiler also includes means for storing objects from said parsing sweeps of the source code, such as as a program representation that persists between compilations.

Preferably, the means for storing objects includes means for storing a prioritized queue of token sequences from the source code program, each token sequence containing at least one declaration for parsing.

The present invention is also directed to a mechanism for compiling programs written in C++ source code without ordering, forward declarations or header files that consists of means for directly parsing top-level declarations from the C++ source code.

Finally, the present invention is directed to a computer program product having new, useful and nonobvious combination of computer readable program code means embodying thereon program code means for implementing the above-described method and compiler mechanism.

BRIEF DESCRIPTION OF THE DRAWINGS

Embodiments of the invention will now be described in detail in association with the accompanying drawings, in which.

DETAILED DESCRIPTION OF THE PREFERRED EMBODIMENTS

Figure 1:
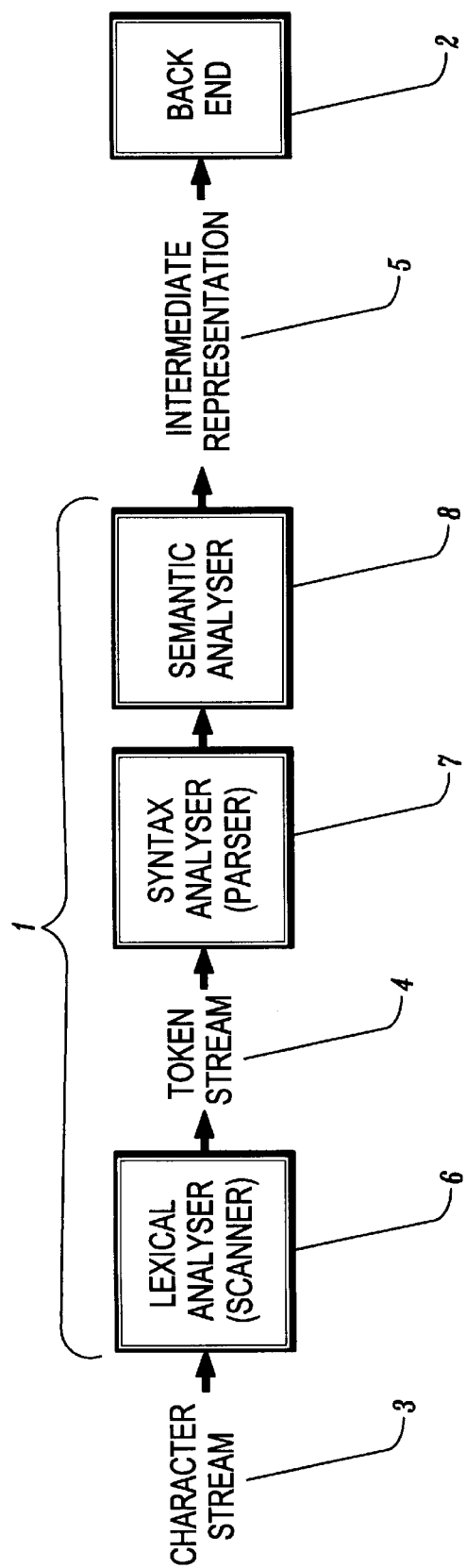
FIG. 1 is a schematic diagram showing conventional compilation in a simple one-pass compiler.

An overview of the operation of a conventional one-pass compiler is illustrated in FIG. 1. The compiler can be divided into a front end 1 which analyses the structure and meaning of the source text. From the source code input as a character stream 3, the front end 1 produces an intermediate representation 5 of the program that is passed to the back end 2. The back end 2 of the compiler generates the equivalent program in the target language (usually modules in object code—called object modules—capable of being combined by a linker or linking loader to form a machine executable program), and may also provide some reorganization of the code for optimal runtime performance.

The front end 1 may be further subdivided into 3 operations or phases; lexical analysis, syntatic analysis and semantic analysis. The lexical analyzer or scanner 6 carries out a simple structural analysis, grouping the individual symbols of the source program text into their logical entities as tokens, and passing a stream of tokens 4 to the next phase. The syntax analyzer or parser 7 analyses the overall structure of the whole program and groups the tokens into the larger constructs (statements, loops and routines) that make up the whole program. Once the structure of the program has been determined, the semantic analyzer 8 checks that the components of the program fit together meaningfully (i.e., determines which variables are to hold floating points and which are to hold integers, checks for definitions of array size, etc.).

Conventional C++ compilers require forward declarations and order to support one-pass parsing. Parsing C++ requires knowing whether or not an identifier is the name of a type, as in the following example:

```
void f( ) {
    T* p; // T is type => Declaration of a pointer variable p.
        // T is variable => operator*(T, p)
}
```

Forward declarations of type-names allow mutually referential types to be constructed in one-pass. For example,

```
struct T;           // Forward declaration
struct S {T* t; };      // ok, T is a typename
struct T {S* s; };
```

Finally, forward declarations allow separate compilation with type checking. Forward declarations are placed in header files, which are then included in both source files that use the declarations and those that provide definitions for the declarations. For example, a header file foo.h with forward declarations

```
typedef float T;
extern T a_t;        // a_t is a variable, its type is T
extern int foo(T);   // foo is a function, it takes a T argument
                     // and returns an int
``` allows definitions to be written that use a_t and foo( ). With this header file included, the following code will compile:

```
#include "foo.h"
int main( ) {
return foo(a_t);
}
```

The same header file is included again when compiling a_t and foo( )'s definitions to ensure consistency between the forward declarations and the definitions.

Thus, for a conventional C++ compiler that performs only a single parsing pass, the programmer is required to create, order and maintain header files that use forward declarations in the manner described above.

Through use of the enhanced compiler of the present invention, forward declarations and ordering can be eliminated in C++ programming, as can header files and the development-environment problems they bring.

Forward declarations and order are needed for one-pass parsing and for separate compilation. By contrast, the present invention utilizes multi-pass parsing. Information about the meaning of C++ identifiers is extracted from the programmer's definitions, not from forward declarations for type names, variables, or functions or programmer-defined ordering of top-level declarations. This requires that all of the definitions must be available simultaneously during compilation, and may be parsed multiple times. In the example above, both the file containing main( ) and the file containing the definitions of foo( ) and a_t would have to be available at the same time and each of these declarations might be parsed more than once. When all of the definitions are not available in source form, for example, in class libraries supplied in compiled form, the forward declarations supplied in the corresponding header files can be used instead.

According to the invention, the top-level declarations are defined to be top-level declaration statements (e.g., global functions and global variables), member functions are defined outside of a class definition, and static members that have variable definitions. Top-level declarations are unordered, but declarations within a top-level declaration must be ordered with respect to each other. Therefore, the following declarations are invalid:

```
class C {
T x;              // T used before declared
typedef int T;
};
int I = j, j;     // j used before declared
```

The source code is parsed one declaration at a time. Any declaration that fails to parse is set aside for a later pass. Each pass accumulates information about the type names, variables and functions in the program. This information includes dependencies, that is the uses in one declaration of names declared in other declarations. (Dependencies are essential for orderless processing of overloaded names.) If the program is correct, the multiple passes will uncover all of the information necessary for parsing; if the programmer has failed to define all of the type names, variables, or functions used in the program, the multiple passes will halt with an error similar to the errors from conventional compilers.

The following simple example consists of two functions and a global variable:

```
int main( ) {
return foo(a_t);
}
T a_t = 4;
int foo(T t) { return t,val( ); }
class T {
public:
T(int I) {_val – I;   }
int val( ) {return _val; }
private:
int _val;
};
```

Omitting some important details for the moment, in the first pass through this program, only the class T will parse. On the second pass, the types of the functions and variables will be parsed. On the third pass, the variable initializers and function bodies will be parsed. Thus by multiple passes, the program can be parsed without the programmer manually-typed forward declarations and without order.

In the preferred embodiment, each pass of the multi-pass parse is called a parse sweep. The processing of each C++ statement containing top-level declarations is called a parse. The data structure that is produced or updated by a parse sweep is called a CodeStore. An execution of a complete parse (through multiple sweeps), whether it ends by successfully parsing all source code or by determining that the input is not legal C++, is called an incorporation, referring to the use of multi-pass parsing to incorporate changes in C++ source files into an existing (but possibly empty) CodeStore. Thus an incorporation consists of multiple parse sweeps, each sweep consisting of parses operating on top-level declarations.

The results of parsing the whole program are stored as a persistent whole-program representation, and only the source code that has changed since the last incorporation or is affected by the changes is processed during subsequent recompilations. In the preferred embodiment a program database (called the Codestore), is used to hold the persistent program representation through the multiple parsing passes. However, it should be recognized that a persistent database is not an essential feature for operation of the multi-pass parsing compiler of the present invention. The requirements for multi-pass parsing are similar to the requirements for single-pass parsing: text input, internal data structures to fill, bookkeeping structures. However, some of the data structures would be persistent (as described below) if the multiple sweeps of the parsing technique were used to update a persistent program database.

While persistent program representations or program databases have been integral to development systems for other languages, they are not generally used in C++ because the benefits from conventional compilation have not been great enough to overcome the performance costs. Areas in which forms of limited program database associated with C++ compilers have been introduced include pre-compiled header files (discussed above) and template repositories. The problem addressed by the latter is that extensive use of C++ templates increases compilation time (and adds code bloat) unless there is some place to store template instantiations. The template repositories many commercial compilers use are intended to counter this problem. However, these solutions are not whole-program databases since, until the present invention, the ability to store more and more information in a program database has been circumscribed by the performance implications of large database size balanced against the benefits attained.

In the preferred embodiment of the present invention, a multi-pass parsing technique has been combined with a whole program representation, such as a program database. It has been found that a program database can implement a dependency analysis more fine-grained than files, reducing unnecessary compilation.

The objects used in the invention are either persistent, meaning that they survive across incorporations, or transient, meaning they are discarded at the end of an incorporation. The persistent objects are stored in the program database, in the preferred embodiment. The transient objects are created for the purpose of incorporation; any state they contain is not needed to begin a new cycle of incorporation.

The CodeStore program representation contains the following types of persistent objects:

Source: A source object supplies source code to the compiler. Most source objects are SourceFile objects, that is, files which contain source code. Although forward declarations are not required and declarations need not be ordered, both forward declarations and order are allowed for compatibility with existing source files. Other kinds of source objects specify programmatic generation of declarations, e.g., source-code builders, wizards, etc.

ProjectControlSource: A project control source lists the names of files that contain source code and/or commands that are run to generate source code. A project control source also contains options used during incorporation, analogous to compiler options. There is a single project control source for each CodeStore in the preferred embodiment.

SourceStore: A source store is a list of the Source objects that comprise the input to the process of the invention. The ProjectControlSource is on this list and is processed to populate the remainder of the list.

Macro: Macro objects represent C++ preprocessor (#define) macros.

MacroStore: A macro store object is a dictionary that maps an identifier to a macro of that name.

SourceRegion: A source region represents a sequence of source code lexical tokens for a single top-level declaration.

Declaration: A declaration object is an internal representation of a C++ declaration. Each SourceRegion parses to one or more Declarations and each Declaration can be specified in multiple SourceRegions.

DeclarationStore: A declaration store object represents a C++ scope. It contains the Declaration objects for all names in the scope that have been successfully processed. These objects are dictionaries; a definition can be retrieved by giving a name to the DeclarationStore. These dictionaries respond to lookup requests using the C++ rules for identifier lookup. Generally speaking, declaration stores and the declarations they contain correspond to the data structures one finds in the symbol table of a conventional compiler.

Implementation: An implementation object represents the result of parsing a function body or variable initializer. For example, an implementation object may contain an abstract syntax tree.

DependencyNode: A dependency node object represents a node in a directed graph that relates object references to object definitions. All of the preceding objects are kinds of dependency nodes.

WorkQueue: A work queue represents the order in which Sources, SourceRegions, and Declarations are processed. The internal structure of the WorkQueues are described below.

MarkerNode: A marker node is a special kind of DependencyNode that is placed on a WorkQueue to change the order of queue processing.

The transient objects, such as preprocessors and parsers, operate on or create the persistent objects during incorporation. An Incorporator object contains all of the transient objects.

All of the persistent objects, except work queues, exhibit dependency node behavior. (In a C++ implementation of the present process, the classes for the persistent objects are derived from a dependency node abstract base class.) Each dependency node includes a list of its antecedent dependency nodes and a list of its dependent dependency nodes. The antecedents of a dependency node D are all the objects that are used as inputs to the processing of D itself; the dependents of D are all the objects that have D as an antecedent, i.e., all those objects that refer to D. Taken together, the dependency nodes and lists of antecedents and dependents form a dependency graph that is used to manage the effects of change.

There are two work, queues of dependency nodes that cause processing to occur; at each step, a dependency node is removed from a queue and processed and, this processing is called an update. The primary work queue is priority-based, with priorities assigned so that dependency nodes are generally processed before their dependents. The secondary work queue operates on a first-in, first-out basis (FIFO) and its entries are processed after processing all dependency nodes of certain kinds (e.g., Sources, Source Regions, and Implementations) that are on the primary queue.

Every dependency node has associated with it one or more values, for example, its type or size. The values are typically computed by an update. When an update determines that the value of the dependency node has changed, the corresponding dependent nodes, which use those values, are added to the primary work queue. In this way, changes to Sources cause reparsing of SourceRegions, changes to Declarations cause regenerating Implementations, and so on.

Each object on the primary work queue is assigned a priority; the highest-priority object is processed next. The initial priorities are assigned to approximate a topological ordering to the dependency graph nodes. Coarse relative priorities are assigned based on the kind of object, ranking those kinds of objects usually need to be processed first with highest priority. Thus the SourceStore has highest priority, the sources are given high priority, followed by SourceRegions that likely declare types, followed then by SourceRegions that likely declare non-types, and followed then by Implementations. These coarse relative priorities are spaced numerically far apart to allow fine-grained priorities to be assigned to individual objects based on their dependency relations. These fine priorities interpolate the coarse priorities and, ideally, higher priority objects rarely depend on lower priority objects.

When an object is updated, the processing can succeed, fail, or fail with progress. Success means that the object's antecedents exist in the CodeStore and that the processor accepted the object as being correct; failure means either that an antecedent did not exist in the CodeStore, or that the object being processed was in error; failure with progress means that the processor failed, but that additional information was put in the CodeStore as a result of the processing. As an example, consider the possibilities when the parser processes a source region. The parse can succeed, and this means that all the names that appeared in the source region were known and that the declaration contained in the source region was correct. Alternatively, one of the names used in the source region could be unknown or the declaration contained in the source region could be incorrect. This is failure; however, if new information was gleaned (e.g., the name of a class), the failure would be a failure with progress.

When an update on an object succeeds, the object is removed from the primary queue and its processing is finished (unless it is later placed on a queue). When an update fails (with or without progress), the object is removed from the primary queue and put on the secondary queue, which is ordered first-in, first-out. Nodes on the secondary queue are processed again, in the manner described below.

According to the invention, parsing continues until either all nodes have been updated successfully, or until the primary queue is empty and an attempt to update all nodes on the secondary queue yields failure without progress on all nodes. In the former case, the parse is complete; in the latter case, the source regions represented by the nodes remaining on the secondary queue are in error and error messages are generated.

In the first phase of the parsing, an attempt is made to parse all interfaces, which essentially comprise: all functions not including bodies contained within braces; top-level variable declarations not including initializers; typedefs; and class, union, and struct declarations not including function bodies. Processing interfaces before processing other declarations gets the effect of forward declarations without burdening the programmer to write and maintain them. The key to efficiency is to do as much processing as possible using the Declaration objects already in the CodeStore for declarations that have not changed since the last incorporation, while using updated or new Declaration objects when the source code has changed.

Figure 2:
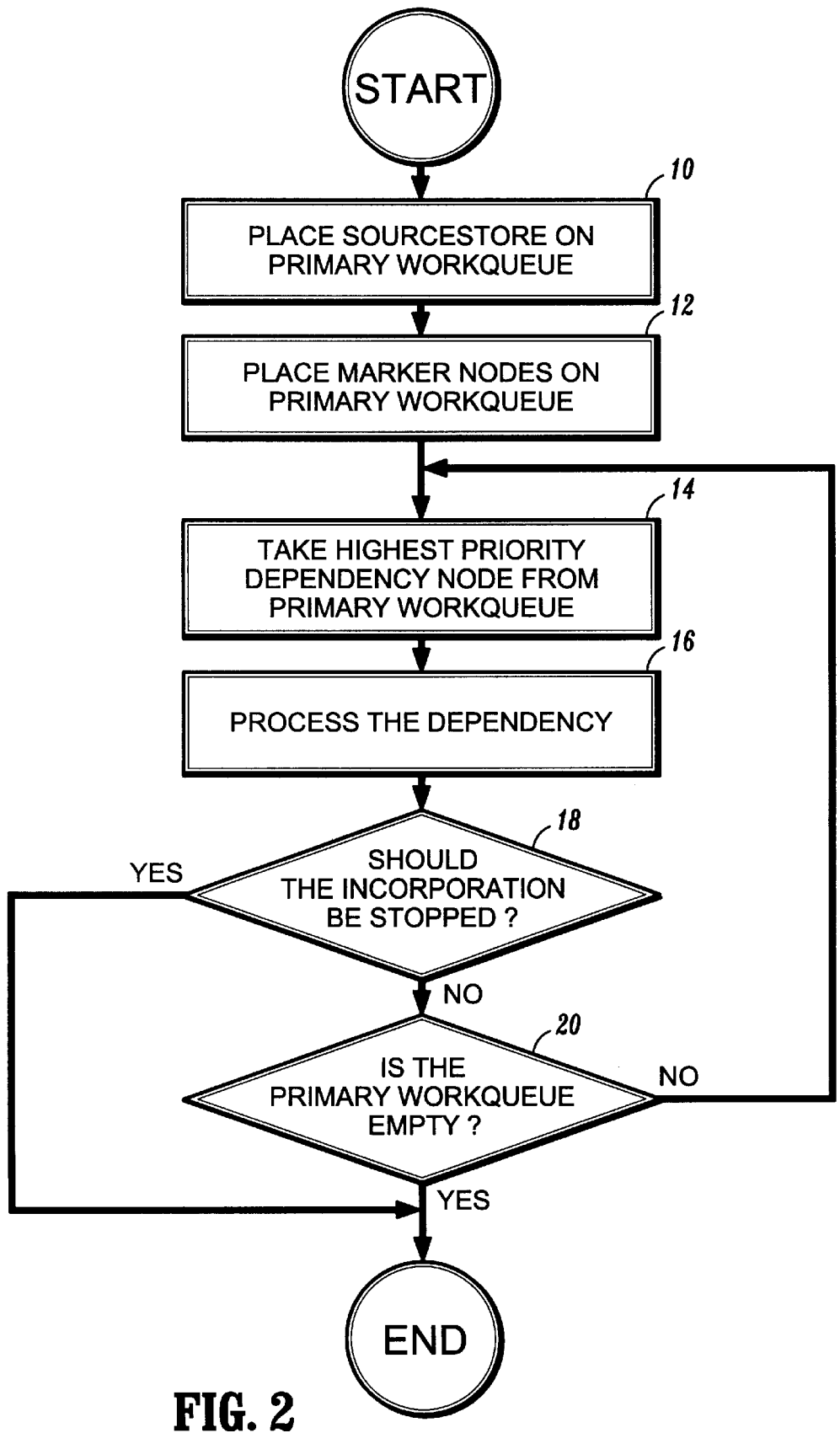
FIG. 2 is a flow diagram showing the main loop of the multi-pass parsing technique of the present invention for a program compilation or recompilation.

Referring now to FIG. 2, when an incorporation begins, the MacroStore contains Macros from Sources scanned in previous incorporations and the DeclarationStore contains Declaration objects that represent the result of the previous incorporation. As illustrated, the SourceStore is placed, with highest priority, on the primary WorkQueue (block 10). In addition, two MarkerNodes are placed on the primary Work-Queue (block 12), one for completion of type name processing and one for completion of non-type name processing. The highest priority dependency Node is removed from the primary WorkQueue and the dependency processed (block 14, 16). If the Dependency Node is a SourceStore, its dependency will be processed following the steps in FIG. 3; if a Source, FIG. 4 steps will be followed; if a SourceRegion, FIG. 6 steps will be followed; if a Marker Node, FIG. 8 steps will be followed; and if an Implementation, FIG. 9 steps will be followed. Incorporation ends when all Dependency Nodes have been successfully processed (block 20) or when a DependencyNode requests that incorporation end (block 18); whis happens for example when MarkerNodes fail to successfully process all nodes in the secondary (retry) queue.

Figure 3:
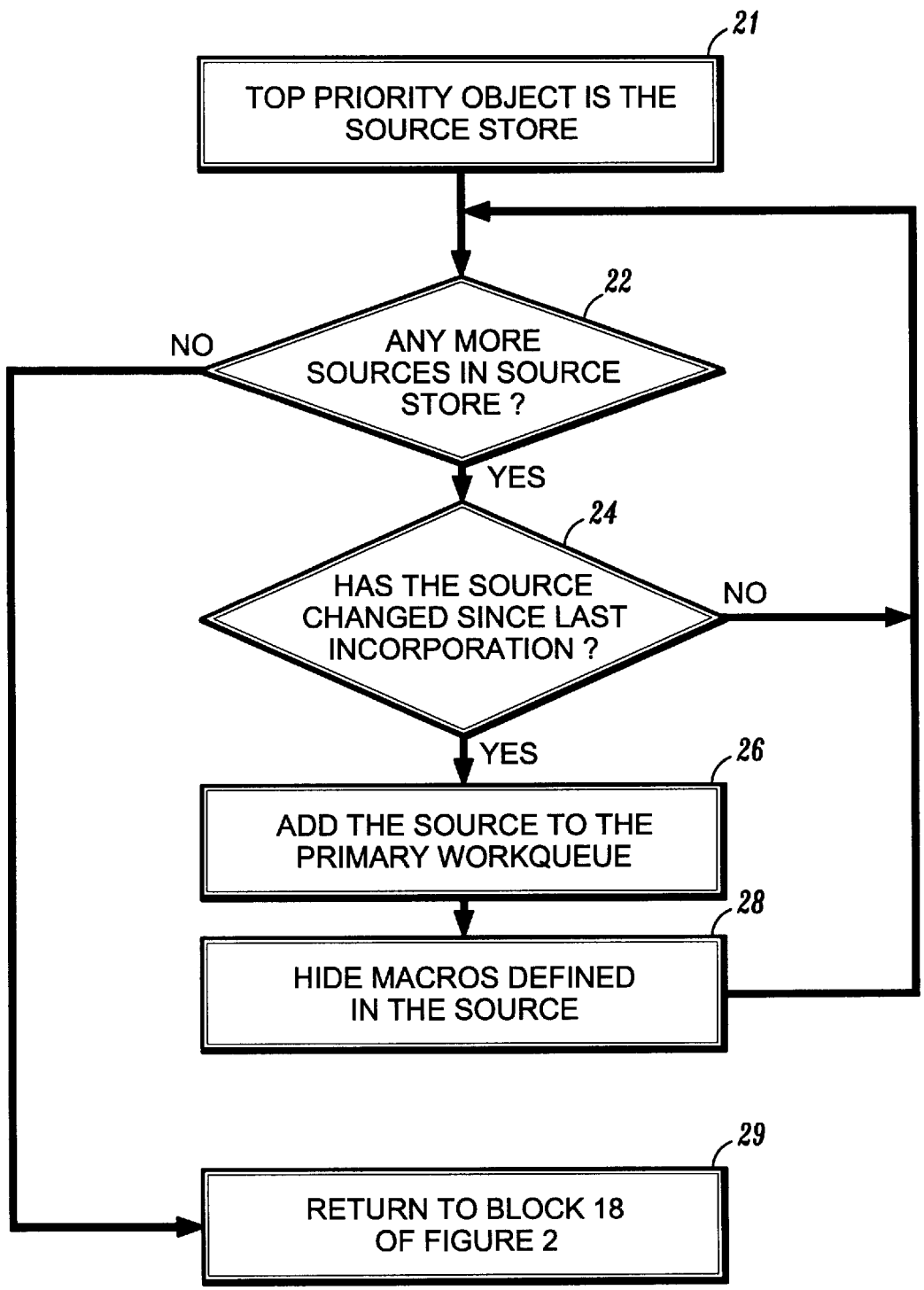
FIG. 3 is a flow diagram showing source file change detection, according to one aspect of the invention.

Referring now to FIG. 3, the top priority item on the primary WorkQueue is the SourceStore (block 21). When the SourceStore is removed from the queue (reference block 14 in FIG. 2), its update function checks the time stamp on the corresponding project control file and, if necessary, updates the list of Sources contained in the SourceStore (block 22, FIG. 3). Then, for each Source object, the time stamp on the corresponding file is checked (block 24) to determine if there has been a change since the last incorporation, and DependencyNode for each out-of-date Source is marked invalid and added to the primary Work-Queue (block 26).

Invalidating a Source causes all Macros defined in that Source to be hidden (block 28). This means that the MacroStore will respond to name lookups on those Macros as if they do not exist. Once the SourceStore has checked all the Sources, processing continues following the main loop of FIG. 2 (blocks 22, 29 of FIG. 3).

Figure 4:
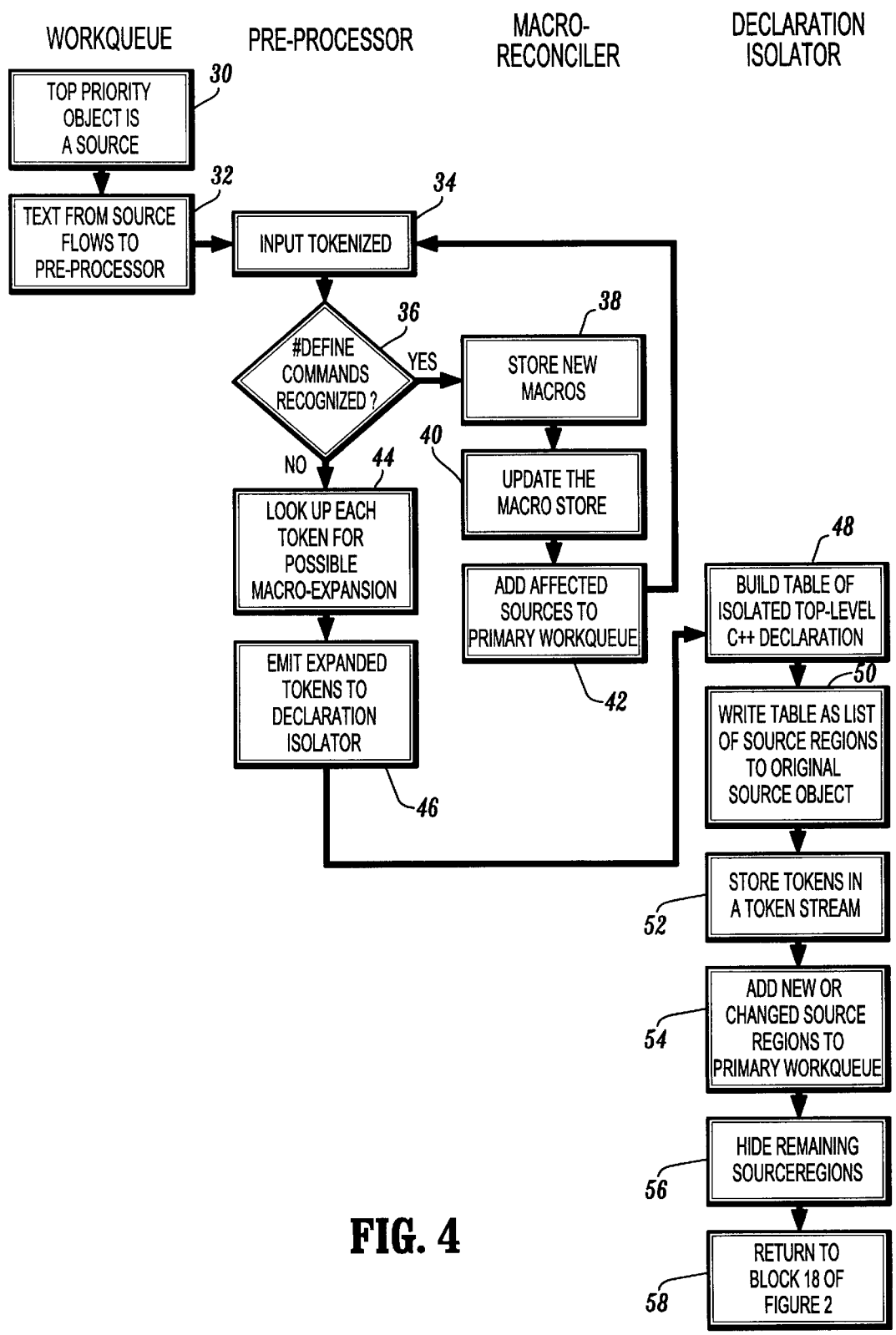
FIG. 4 is a flow diagram showing source file updating during recompilation, according to another aspect of the invention.
Figure 5:
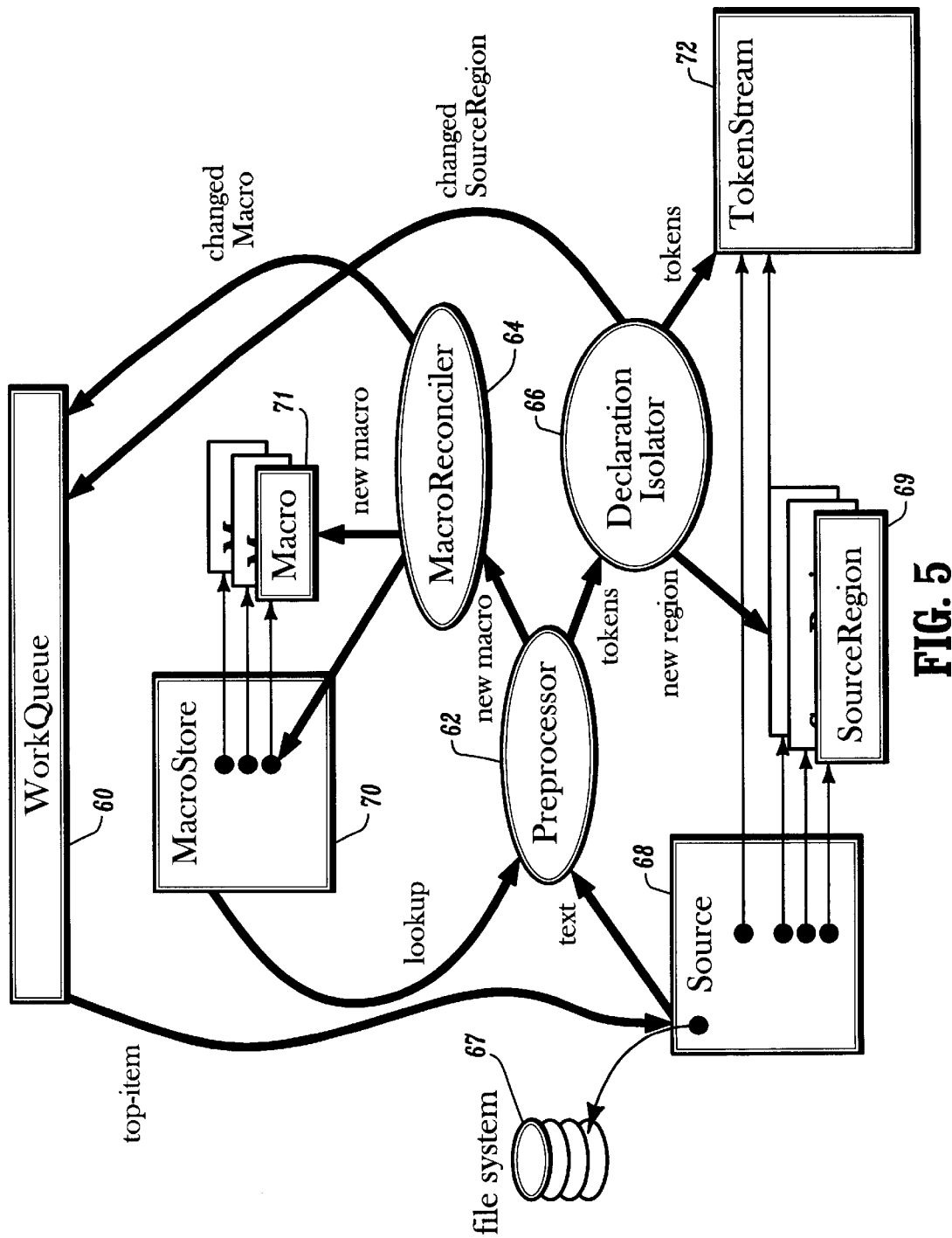
FIG. 5 is a data control flow representation of the steps illustrated in FIG. 4.

In the next stage, each of the Source objects is decomposed into SourceRegions. This occurs whenever a Source object appears on the top of the primary WorkQueue. FIGS. 4 and 5 illustrate the preprocessing stage of incorporation. In the data control flow schematic of FIG. 5, rectangles represent persistent objects in the CodeStore and ovals represent transient objects. Thin arrows represent pointers between objects; thick arrows represent data flow. Referring first to FIG. 4 the Source on top of the primary WorkQueue is removed and its update function is called (blocks 30, 32).

The Source update function uses the transient objects illustrated in FIG. 5:

a C++ preprocessor 62 for extracting macro definitions and expanding macros defined in source code files that takes source text 68 and the MacroStore 70 and emits new macros 72 and a stream of preprocessed C++ token;

a MacroReconciler 64 that takes new macro definitions from the Preprocessor and updates the MacroStore 70; and a DeclarationIsolator 66 that breaks the stream of tokens from the PreProcessor 62 into SourceRegions.

First the Source's text stream is passed to the Preprocessor together with the MacroStore (block 32, FIG. 4), and the Preprocessor tokenizes the input (block 34). Any Macros defined in the Source, recognized by #define commands, are passed to the MacroReconciler (block 36) for updating. If the defined Macro is identical to an existing Macro, the hidden status is removed on the existing Macro; otherwise a new Macro is added to the MacroStore (blocks 38, 40), and the MacroReconciler adds affected Sources to the primary WorkQueue by enqueuing Source for reprocessing that may be altered by new or changed Macros (block 42). Next, the Preprocessor looks up each token for possible macro-expansion (block 44). This is the usual expansion of macros as understood by those skilled in the art. Tokens output from the Preprocessor are then fed into the DeclarationIsolator (block 46) where SourceRegions are identified and those that are new or changed are placed on the WorkQueue by following the steps of declaration isolation then priority selection and queue placement (blocks 48 to 54).

Declaration isolation consists of partitioning the stream of tokens into individual declarations by matching braces, parentheses and square brackets. Linkage specifications and name space specifications are distributed over the declarations contained in them.

As a result of this isolation process, a list of SourceRegions for a Source is generated. All C++ declarations will be wholly contained within one SourceRegion. All of the tokens output from the preprocessor will be assigned to SourceRegions.

Some source code may fail to decompose into SourceRegions. For example, mismatched braces or a missing semi-colon will cause the SourceRegion algorithm to hit an end of file while searching for the end of a declaration. In this case an error message can be emitted and processing of that Source will stop.

If this Source existed during the last incorporation, compare each newly extracted SourceRegion to the stored SourceRegions. If any of these comparisons yield exact matches, the new version is deleted. In this way unchanged C++ declarations need not be parsed or otherwise processed. As this comparison happens on preprocessed tokens, changes to comments and white-space do not cause recompilation.

The DeclarationIsolator also classifies each SourceRegion as probably a type-defining or probably a non-type-defining region. If the top-level tokens in the SourceRegion contain one of the keywords class, struct, union typedef or enum, the SourceRegion is probably a type-defining region. Type-defining regions are given higher priority on the WorkQueue than non-type-defining regions to reduce the number of parsing passes. Incorrect classification does not affect the correctness of the results of using the invented technique.

After classification, a SourceRegion and the stream of tokens that it represents are added to the CodeStore (block 52). The SourceRegion is then placed on the primary WorkQueue (block 54). After all text in the Source has been processed, any SourceRegions for the Source remaining from previous incorporations, that is, those that did not match incoming SourceRegions, are hidden and processing continues in FIG. 2 (blocks 56, 58 of FIG. 4).

In summary, the first stage of the process begins with Sources on the WorkQueue and ends with SourceRegions on the WorkQueue. In between the Source is pumped through the preprocessor, the MacroStore filled and used, and the DeclarationIsolator exercised to produce the SourceRegions enqueued for the next stage in the algorithm. This first stage ends when there is a SourceRegion at the front of the primary queue (block 80, FIG. 6).

Figure 6:
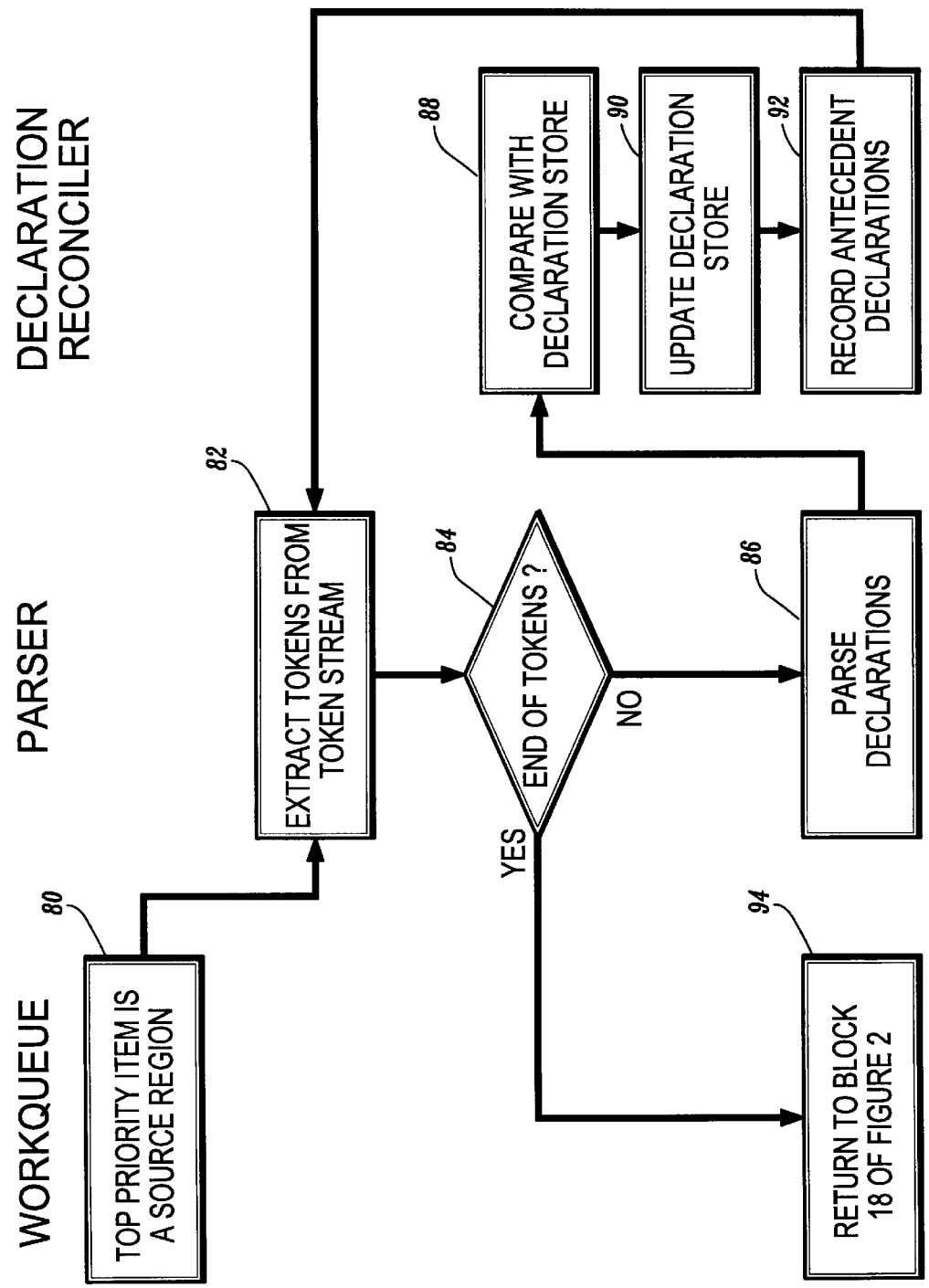
FIG. 6 is a flow diagram showing updating of a persistent object called the SourceRegion, according to a further aspect of the invention.
Figure 7:
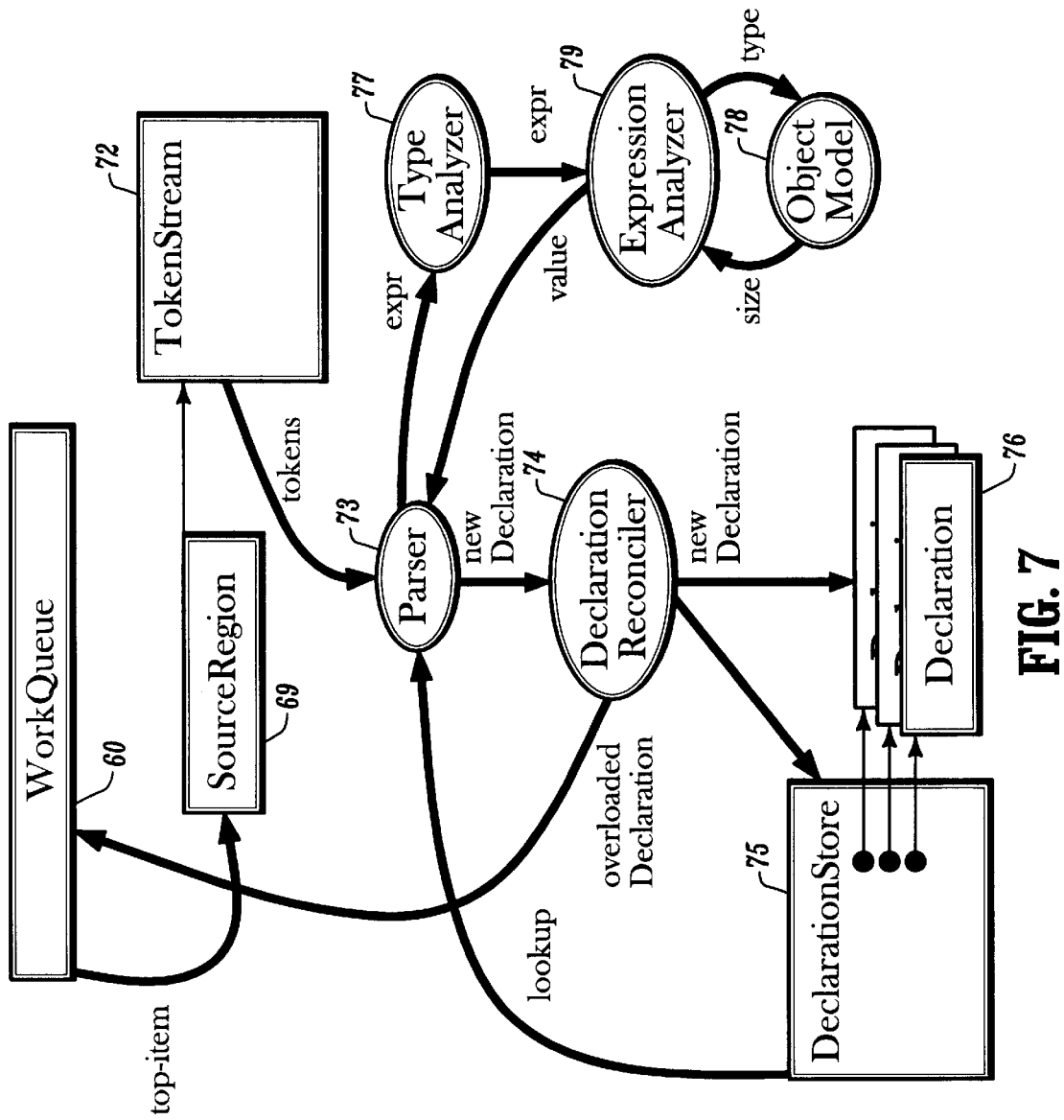
FIG. 7 is a data control flow representation of the steps illustrated in FIG. 6.

The next stage of the process is designed to collect the "interfaces" declared in the SourceRegions on the WorkQueues and is illustrated in FIGS. 6 and 7. Interfaces are roughly like the C++ declarations in header files, but defined as follows:

- the type of variables: const integral variables are treated specially (see below);
- the return type and argument list of functions, excluding default function arguments;
- the kind of type (class, struct, union, or enum); the interfaces contained in a class, struct, or union
- enumerator initializers;
- typedef definitions;
- access declaration scopes;
- interfaces contained in extern declarations and namespaces;
- function template return type, argument list, and parameter declarations;
- class template parameter declaration, kind, and contained interfaces.

A constant integral type variable initialized with a constant expression and an enumerator with an initializer are treated as special cases since they can appear in constant expressions defining types.

In general terms, interfaces are extracted by parsing the tokens stored in SourceRegions. Parsing alone is insufficient however, since interfaces can be dependent upon constant expressions which can themselves depend upon the sizes of type definitions, and templates may have to be instantiated in order to parse non-templates.

The transient objects used in this stage of the algorithm are illustrated in FIG. 7. They are:

- a Parser 73 that reads the tokens of a SourceRegion and analyzes them by looking up programmer-defined symbols in the DeclarationStore 75 to produce a Declaration 76 or an error message;
- a DeclarationReconciler 74 that takes the new declaration 76 created by the Parser, loads it into the DeclarationStore 75, and places the SourceRegion 69 objects for any Declarations 76 whose parse may be changed by the presence of the new declaration on the WorkQueue 60;
- a TypeAnalyzer 77 that takes a C++ expression and gives the C++ type that the expression evaluates to, i.e. a variable's type, a function's return type, or an expression's result type;
- an ObjectModel 78 that takes a C++ type and returns the C++ size of value for that type; and
- an ExpressionEvaluator 79 that takes an C++ expression and returns the C++ value computation for that expression; only constant expressions will be evaluated.

Referring to FIG. 6 each time the Incorporator tales a SourceRegion from the top of the WorkQueue and calls its update function (block 80), the SourceRegion's TokenStream is passed to the Parser (block 82). The parser scans for new declaration names (block 86), using the existing CodeStore to lookup names used in forming the C++ declarations. When a new declaration is recognized, the parser calls the DeclarationReconciler. The DeclarationReconciler compares the Declaration name with the DeclarationStore (block 88), and adds a new Declaration or changes an existing one in the DeclarationStore (block 90). When control returns to the Parser, newly added declarations have been recorded and are available for subsequent lookup (block 92). Once all of the tokens have been processed, the main loop steps continue processing (blocks 84, 94 of FIG. 6).

The parsing of some declarations may result in more than one entry in the DeclarationStore. These cases include compound declarations, anonymous unions, and enumerations. For examples,

---

```
// Compound declaration: 1 parse, 2 declarations entered.
int i, j;
    // Anonymous union: 1 parse, 3 declarations
union { int u; float v; };
    // enumeration, 1 parse, 3 declarations.
enum Polygon { triangle = 3, rectangle = 4 };
```

---

The latter two cases inject declarations from within matching braces to an enclosing scope.

In the DeclarationReconciler, any other Declarations used by the Parser in parsing the SourceRegion of this Declaration are recorded as "antecedent" declarations (block 92). Briefly, each SourceRegion has a list of pointers to the Declarations used to parse it (antecedents) and each Declaration has a list of pointers to SourceRegions it is referenced in (dependents). These pointers are used in overload processing as described below.

For function definitions, the DeclarationReconciler creates a new entry on the WorkQueue for the function body; for variable definitions, the DeclarationReconciler creates a similar entry for the variable initializer. These entries are placed on the WorkQueue at a priority below any SourceRegion entry so that they will be considered during Implementation parsing. The successful SourceRegion is removed from the WorkQueue and the interface parse step ends.

An interface parse step failure can result either from erroneous source text provided by the programmer or Parser failure when looking up a name in the DeclarationStore. As it generally cannot be determined whether the programmer omitted a declaration or whether the declaration will appear in a later SourceRegion further down the WorkQueue, SourceRegions which fail to parse are placed on the secondary (retry) queue.

If the interface parse fails, a declaration may still have been entered in the DeclarationStore. If the Parser has determined that the declaration is a class, it will cause the DeclarationReconciler to enter a class declaration marked as "partially-defined" into the DeclarationStore as described below.

As an interface is parsed, the names of instances of class templates may be encountered. If the body of an instantiated template is needed in order to parse, and the template has not yet been fully instantiated, then the parse fails (as it would for any other name-lookup failure). In addition, a DependencyNode for the template instantiation is added to the WorkQueue. Just as the rules of the C++ language dictate, a template class name only creates the equivalent of a forward class declaration; neither the body of the class nor the bodies of member functions are instantiated until they are needed. In all cases, if template expansion fails, the parse of the dependent SourceRegion does not succeed.

At the end of each interface parse step, one SourceRegion has been removed from the WorkQueue to be parsed and either one or more declarations have been added to the DeclarationStore, or the SourceRegion has been placed on a secondary FIFOQueue, or, for classes, enums, and declarations of template instances, both of these may have happened. If any declaration has entered the DeclarationStore, the Incorporator records that it has made progress.

Figure 8:
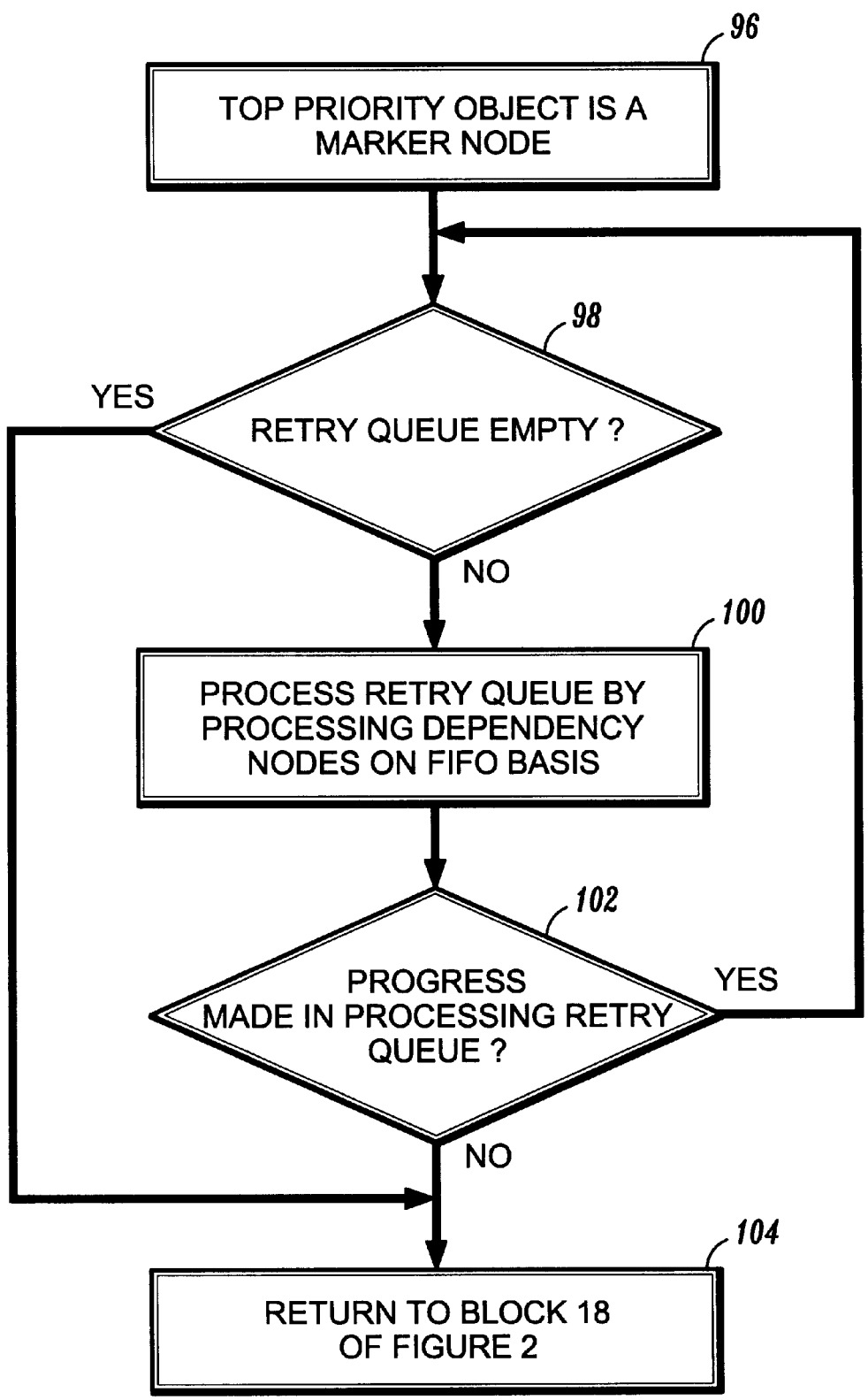
FIG. 8 is a flow diagram showing processing of a persistent object called a Marker Node, according to another aspect of the invention.
Figure 9:
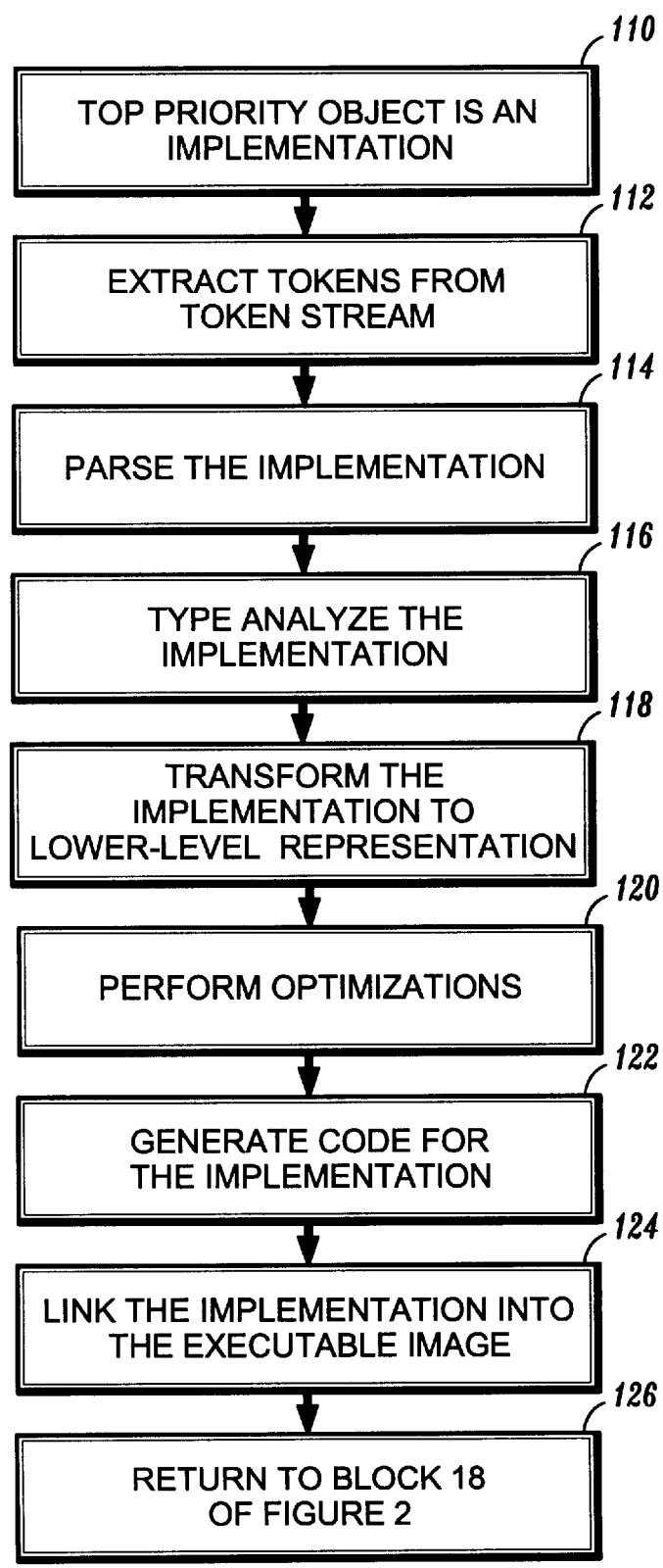
FIG. 9 is a flow diagram showing processing of a persistent object called an Implementation, according to another aspect of the invention.

The first pass of interface parsing continues until the MarkerNode for completion of type name processing is encountered (block 96, FIG. 8). When the MarkerNode is dequeued the size of the secondary (retry) queue is tested (block 98).

If the retry queue is not empty, then it is repeatedly processed, by updating each of its DependencyNodes, until either the queue is emptied (by successful updates) or all DependencyNode updates fail (blocks 100, 102). Once the secondary (retry) queue is empty, processing returns to the main loop (blocks 98, 104).

The next DependencyNode is removed from the primary queue of the WorkQueue and its update function called (blocks 20, 12, 14, FIG. 2). SourceRegions encountered during this stage are processed in the same way as previously. The entire purpose of having these two stages is to reduce the number of failed parses from missing type names. By recursing over the type name SourceRegions first, all type names are extracted before any regions that do not contain type names are tried. When a second MarkerNode, for completion of non-type names, rises to the top of the primary WorkQueue, the retry queue is again processed until convergence.

The above description refers to special treatment for class declarations. Class declarations are treated as a special case because they "contain" member declarations, some of which might be types vital to the unambiguous parsing of other declarations. The contained type names, the interfaces of contained member functions, and the interfaces of contained member variables are needed to compute sizeof that may appear in the definitions of other types. Failure to parse one or a few members cannot result in complete failure of the parse of a class or no progress will be made.

For example, the Parser can determine that X is a class in this code even if the nature of Y is not known:

```
struct X {
    Y* y; // Parse fails if Y is not in the declaration store.
};
```

Recording the information that X is a class is vital when other classes used in specifying members of X use the type name X in their declarations. For example, if the following source-code object appears after the one above, the compiler needs to know that X is a type name:

```
struct Y { // seen later
    X* x; // Ok, if X is a struct.
};
```

Thus class declarations must be entered into the DeclarationStore even when the parse of their contained declarations fails. Furthermore, the class body must be parsed to look for nested types as well. Having done this, any successfully parsed member declarations can be saved, since if the class is completed, there is no need to consider it again.

The special treatment of class declarations consists of the following. If the Parser sees one of the C++ keywords class, struct, union, or enum followed by a previous undeclared identifier, it creates an class declaration named by the identifier and marks that class or enum as "partially-defined". The class declaration is passed to the DeclarationReconciler which enters it into the DeclarationStore, creating a DeclarationStore for the classes members. If remaining work in the class body parse succeeds and if the result is an class declaration, then the class is marked as "defined". Otherwise the Parser reports an error but the partially-defined class declaration remains in the DeclarationStore and the Incorporator is marked as having made progress.

Although the partial-definition is described as a special case, this behavior is the typical one for parsing C++ declarations. C++ specifies that a type declaration is known as such as soon as its identifier is parsed. Thus code like

```
struct Z {
    Z* z; // Z is a type name
};
``` is legal in a single-pass parser even though the use of Z comes before the closing brace of the class declaration.

Constant expressions can appear in array bounds and template arguments that define types, including types that appear in the interface for variables and functions. They can also appear in initializers for const integral variables, enumerators, and bit-field lengths, all of which can appear in constant expressions directly or through the size of operator. Consequently, constant expressions must be parsed and evaluated during the interface parse sweep in order to parse all interfaces.

Constant expressions consist of literals whose values are given directly and objects whose values can be deduced without run-time information: the value of enumerators (a constant integral object), the value of constant integer variables initialized with constant expressions, and the value of sizeof expressions. The values that must be deduced are treated in the following manner.

Enumerators values are precomputed when they are entered into the CodeStore. Enumerators must be initialized with constant expressions. Once the Parser recognizes that an enumeration is being processed, it sends the enumeration name to the DeclarationReconciler as in class processing. Then the Parser attempts to parse the contained enumerators. Initializers are parsed, type analyzed, and evaluated; if the result is not a constant integral value the parse step fails.

Integral variables declared const are precomputed as was done for enumerators. They need not be initialized with constant expressions so a non-const value does not cause the parse step to fail.

The value of sizeof expressions are computed on demand. The operands of sizeof are parsed whenever they are encountered in the interface parse. The argument to sizeof can either be a type name or an expression. If it is a type name, it must resolve to a fully defined type; otherwise the parse fails. If it is an expression, the expression is type-analyzed, and the size of the resulting type is calculated.

After interfaces have been successfully parsed, the WorkQueue has one entry, called an "implementation", for each function body and variable initializer found when Declarations were added to the DeclarationStore. During the implementation parsing that is, when the top priority item on the primary WorkQueue is an Implementation (block 110, FIG. 9), these entries are removed one at a time (block 112) and parsed (block 114). C++ declarations encountered during this parse are used to create Declarations inserted into a DeclarationStore representing the function's local scope; C++ expressions encountered during this parse are passed to the TypeAnalyzer. These steps cause additional dependency graph arcs to be added between the implementation and the Declarations needed to parse and type analyze it (block 116).

As in the parse of interfaces, class template instance name lookup may cause class template expansion. In addition, the TypeAnalyzer may match function calls to function template names. If the corresponding template instance has not been used before, the body of the template instance is placed on the WorkQueue below any other implementation. These implementations are processed when their WorkQueue entries are encountered during this implementation parse sweep. Once type analysis (block 116) has completed successfully, the implementation is transformed to a simpler form suitable for generating machine code (block 118). At this stage of implementation processing, this simpler form can be optimized so that more efficient machine code is generated (block 120). Then implementation processing can continue through to produce the machine code, and link it into the program (blocks 122, 124), before returning to the main loop of the present invention (block 126). Exceptions to the simple pattern are caused by overloading as discussed below.

Expansion of templates during implementation parsing may inject new Declarations into the namespaces used in interface or other implementation parses. For example, consider inline friend functions in class templates

```
template<class T>
class X
{
public:
friend int operator==(const T& a, const T& b) { return a.equiv(b); }
};
```

This operator is added to the global namespace during instantiation of the template. After injection, functions compiled without considering this interface can be invalid. For example,

```
struct A
operator int( );
};
void fnc_a( ) {
A a1;
A a2;
a1 == a2; // converts A->int then calls == for ints
}
```

Up to this point there are no errors. Incorporating this function yields:

```
void fnc_x( ){
X<A>I; // injects operator==(A&,A&)
}
```

The injection will change the type analysis of fnc_a.
Function overloading can have a similar effect on types. For example, suppose this code has been parsed:
int foo(int I){return I;}
int bar[10*sizeof(foo(1.0))];
The expression 1.0 is converted to an int and the return type of the sole function foo( ), int, is used to in the array size expression. Then this SourceRegion is encountered:
double foo(float f){return f+0.5; }
Now the type of bar must be reevaluated to correct the size of the array.

Both of these examples are handled by a general mechanism that also implements CodeStore update. As we have mentioned in several places, each time a Declaration is referenced, a pointer is placed in the DependencyNode of the Declaration pointing back to the referring DependencyNode. This comprehensive list of uses is employed to correct Declarations in the presence of declaration injection and overloading. For overloaded names, the correction is simple: users of declarations of the same name are removed from the CodeStore and their SourceRegions are enqueued for reprocessing. For injected and global operators, all uses of conversion operators must be enqueued on the types mentioned as arguments of the injected operator.

Since the WorkQueue entries are always processed in order of highest priority, interface parse cycles may interrupt the implementation parse sweep. Once we reach the last implementation entry in the WorkQueue is reached, the incorporation is over.

If incorporation ends successfully, the DeclarationStore can be passed along for further processing, including inspection or subsequent compilations. If the incorporation fails, generally the programmer will be notified to the errors and their location. A programmer may need to inspect the DeclarationStore to correct the source code; traversal of the DeclarationStore in this case needs to be aware that some declarations may only be partially defined.

The embodiments of the invention in which an exclusive property or privilege is claimed are defined as follows:

1. A compiler for compiling a C++ program in source code, comprising:
    means for making an initial sweep of the source code, one declaration at a time, to obtain declarations;
    means for setting aside any declaration for which not all identifiers are known in said initial sweep;
    means for making at least one subsequent sweep of the source code with respect to said initial sweep to obtain definitions for the declarations set aside from the initial sweep; and means for saving the declarations to a program representation following each sweep of the source code, where said saving means comprises:
means for updating an existing representation with new or changed definitions;
means for incrementally compiling at least some of the declarations in the source program as all of the identifiers corresponding thereto become known upon one of the initial sweep and the at least one subsequent sweep.

2. A computer-implemented method for compiling a C++ program in source code, comprising the steps of:
making an initial sweep of the source code, one declaration at a time, to obtain declarations;
setting aside any declaration for which not all identifiers are known in said initial sweep;
subsequent to said initial sweep, making at least one subsequent sweep of the source code to obtain definitions for the declarations set aside from the initial sweep;
incrementally compiling at least some of the declarations in the source program as all of the identifiers corresponding thereto become known upon one of the initial sweep and the at least one subsequent sweep; and
saving the declarations to a program representation following each sweep of the source code; and
where said saving step comprises the step of updating an existing representation with new or changed definitions.

3. The method of claim 2 wherein the program representation persists between compilations.

4. The method of claim 3 wherein the program representation is saved to a program database.

5. A computer-implemented method for compiling a C++ source code program in an enhanced compiler effecting lexical analysis to tokenize the source code program, parsing and semantic analysis to produce an intermediate representation of the source code program, comprising the steps of:
parsing the tokenized source code program in any order with respect to declarations in the program through multiple parsing passes, each pass accumulating information to parse the declarations in the source code program for which all identifiers are unknown, from program definitions, wherein the multiple parsing passes comprise an initial pass that parses only type declarations, a second pass that parses types of functions and variables, and a third pass that parses variable initializers and function bodies;
saving a program representation of parsed declarations after each parsing pass; and
updating said program representation after a parsing pass with new or changed information on any declarations obtained during said parsing pass.

6. The method, according to claim 5, wherein in the said subsequent pass, information about type names, variables and functions in the tokenized source code program is accumulated.

7. The method, according to claim 5, wherein the multiple parsing passes comprise three passes, and wherein types of functions and variables from the tokenized source code program are parsed in a second pass and variable initializers and function bodies from the tokenized source code program are parsed in a third pass.

8. The method, according to claim 5, wherein the program representation persists between compilations.

9. The method, according to claim 8, wherein the program representation is saved to a program database.

10. A compiler adapted to compile programs written in C++ source code, comprising:
a parser adapted to extract definitions for declarations used in the programs directly from the source code by effecting multiple parsing sweeps of the source code in any order with respect to the declarations, wherein the multiple parsing sweeps comprise an initial sweep that parses only type declarations, a second sweep that parses types of functions and variables, and a third sweep that parses variable initializers and function bodies; and
means for storing objects from said parsing sweeps;
wherein the means for storing objects comprises:
means for storing a prioritized queue of token sequences from the source code program, each token sequence containing at least one declaration for parsing.

11. The compiler, according to claim 10, wherein the means for storing objects includes means for storing a representation of the source code parsed from a parsing sweep as a program representation.

12. The compiler, according to claim 10, wherein the means for storing objects comprises means for storing objects in a representation that persists between compilations.

13. The compiler, according to claim 12, wherein the means for storing objects comprises a program database.

14. The compiler according to claim 13 wherein the means for storing objects comprises means for storing a whole program representation of the source code parsed from a parsing sweep in the program database, and further comprises means for updating said whole program representation following subsequent parsing sweeps.

15. The compiler, according to claim 10, wherein the prioritized queue comprises a primary queue and a secondary queue, the primary queue being adapted to store at least one token sequence initially obtained from the source code program prior to any parsing sweeps and the secondary queue adapted to store token sequences for declarations that failed to parse after any parsing sweep.

16. The compiler, according to claim 15, further comprising a preprocessor adapted to:
extract macro definitions;
expand macros defined in the source code program;
emit new macros to the program representation; and
emit a stream of preprocessed C++ tokens to the primary queue.

17. The compiler, according to claim 16, wherein the preprocessor extracts the macro definitions from the program representation.

18. A program storage device readable by a machine, tangibly embodying a program of instructions for an enhanced compiler for compiling a C++ source code program by effecting lexical analysis to tokenize the source code program, parsing and semantic analysis to produce an intermediate representation of the source code program, the improved method steps comprising:
parsing the tokenized source code program through multiple parsing passes performed in any order with respect to declarations in the source code program, each pass accumulating information to parse the declarations in the source code program for which all identifiers are unknown, from program definitions, wherein the multiple parsing passes comprise an initial pass that parses only type declarations, a second pass that parses types of functions and variables, and a third pass that Parses variable initializers and function bodies; and saving a program representation of parsed declarations after each parsing pass; and updating said program representation after a parsing pass with new or changed information on any declarations obtained during said parsing pass.

19. The program storage device of claim 18, wherein in said subsequent pass, information about type names, variables and functions in the tokenized source code program is accumulated.

20. The program storage device of claim 8, wherein the multiple parsing passes comprise three passes, and wherein types of functions and variables from the tokenized source code program are parsed in the second pass and variable initializers and function bodies from the tokenized source code program are parsed in the third pass.

21. The program storage device of claim 18, wherein the program representation persists between compilations.

22. The program storage device of claim 21, wherein the program representation is saved to a program database.

23. A program storage device readable by a machine, tangibly embodying a program of instructions executable by the machine for performing method steps for compiling a C++ program in source code, said method steps comprising:

making an initial sweep of the source code, one declaration at a time, to obtain declarations;

setting aside any declaration for which not all identifiers are known in said initial sweep;

subsequent to said initial sweep, making at least one subsequent sweep of the source code to obtain information corresponding to the set aside declarations of names declared in other declarations; and saving the declarations to a program representation after each parsing pass;

wherein said saving step comprises the step of updating an existing representation with new or changed definitions.

24. The program storage device of claim 23, wherein the program representation persists between compilations.

25. The program storage device of claim 24, wherein the program representation is saved to a program database.

26. A computer-implemented method for compiling a C++ program in source code, comprising the steps of:

in a first sweep of the source code, parsing said source code to obtain type declarations, and storing data identifying a We declaration for which not all identifiers are known in said first sweep;

in at least one second sweep of the source code that automatically follows said first sweep, parsing the source code to accumulate information identifying at least one of type names, types of variables and types of functions in the source program;

utilizing said information to obtain declarations for at least one type declaration identified by said data stored in said first sweep; and saving said declarations to a program representation;

wherein said saving step comprises the step of updating an existing representation with new or changed definitions.

27. The method of claim 26, wherein the program representation persists between compilations.

28. The method of claim 27, wherein the program representation is saved to a program database.

29. A program storage device readable by a machine, tangibly embodying a pro gram of instructions executable by the machine for performing methods steps for compiling a C++ program in source code, said method steps comprising:

in a first sweep of the source code, parsing said source code to obtain type declarations, and storing data identifying any type declaration for which not all identifiers are known in said first sweep;

in at least one second sweep of the source code that automatically follows said first sweep, parsing the source code to accumulate information identifying at least one of type names, types of variables and types of functions in the source program;

utilizing said information to obtain declarations for at least one type declaration identified by said data stored in said first sweep; and saving said declarations to a program representation;

wherein said saving step comprises the step of updating an existing representation with new or charged definitions.

30. The program storage device of claim 29, wherein the program representation persists between compilations.

31. The program storage device of claim 30, wherein the program representation is saved to a program database.

* * * * *